United States Patent [19]

Das et al.

[11] Patent Number: 5,194,331

[45] Date of Patent: Mar. 16, 1993

[54] FIBERS MADE FROM CYANATO GROUP CONTAINING PHENOLIC RESINS AND PHENOLIC TRIAZINES RESINS

[75] Inventors: Sajal Das, Parsippany; Dusan C. Prevorsek, Morristown, both of N.J.

[73] Assignee: Allied-Signal Inc., Morristown, N.J.

[21] Appl. No.: 776,649

[22] Filed: Sep. 16, 1991

Related U.S. Application Data

[60] Continuation of Ser. No. 388,204, Aug. 1, 1989, abandoned, which is a division of Ser. No. 135,946, Dec. 21, 1987, Pat. No. 4,851,279.

[51] Int. Cl.$^5$ .................................................. D02G 3/00
[52] U.S. Cl. .................................... 428/364; 528/162; 528/164; 525/504; 525/480; 428/224; 428/359
[58] Field of Search .................. 428/224, 359, 364; 528/142, 146, 162; 525/480, 504

[56] References Cited

U.S. PATENT DOCUMENTS

| | | | |
|---|---|---|---|
| 3,448,079 | 6/1969 | Grigat et al. | 260/59 |
| 3,650,102 | 3/1972 | Economy et al. | 57/140 R |
| 3,890,272 | 6/1975 | D'Alelio | 260/47 |
| 3,929,713 | 12/1975 | D'Alelio | 260/32.6 |
| 3,966,670 | 6/1975 | Grason et al. | 260/38 |
| 4,022,755 | 5/1977 | Tanigaichi et al. | 260/59 |
| 4,076,692 | 2/1978 | Batha et al. | 260/59 R |
| 4,096,108 | 6/1978 | Webb et al. | 260/38 |
| 4,118,377 | 10/1978 | D'Alelio | 260/47 |
| 4,157,360 | 6/1979 | Prevorsek et al. | 260/860 |
| 4,218,361 | 8/1980 | Jones et al. | 260/38 |
| 4,219,452 | 8/1980 | Littlefield | 260/3 |
| 4,268,657 | 5/1981 | Manzara | 528/155 |
| 4,281,361 | 7/1981 | Patz et al. | 361/401 |

FOREIGN PATENT DOCUMENTS

| | | |
|---|---|---|
| 0147548 | 7/1981 | European Pat. Off. |
| 59-149918 | 8/1976 | Japan |
| 59-34822 | 7/1983 | Japan |
| WO85/03713 | 5/1986 | PCT Int'l Appl. |

OTHER PUBLICATIONS

Dicyano Ethers of Bisphenols, S. V. Finogradova, et al. pp. 749-750; Organic Synthesis, Cyanic Esters from Phenols, Phenyl. Cyanate, Ed. R. Stevens, John Wiley & Sons, N.Y., vol. 61 (1983) Esters of Cyanic Acid, Valuable Intermediates in Organic Snthesis, Joachim Kohn.

U.S. Ser. No. 041,018, filed Jan. 16, 1987, PCT/US 87/00123.

Novoloid Fibers, Kirk-Othmer, Encyclopedia of Chemical Tech., vol. 16, pp. 125-138; U.S. Ser. No. 104,700 Filed Oct. 5, 1987.

U.S. Ser. No. 041,018, filed Jan. 16, 1987, PCT/US 87/00123.

*Primary Examiner*—Patrick J. Ryan
*Assistant Examiner*—N. Edwards
*Attorney, Agent, or Firm*—R. C. Stewart, II; G. H. Fuchs; D. L. Webster

[57] ABSTRACT

The present invention is a fiber comprising cyanato group containing phenolic resin comprising repeating units of the formula:

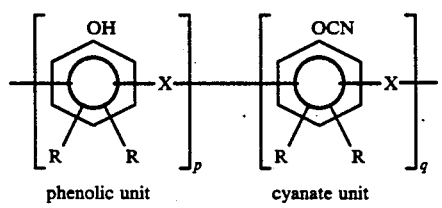

phenolic unit      cyanate unit wherein p is 0 or an integer of one or more, q is 0 or an integer of 1 or more, X is a radical selected from the group consisting of: $-CH_2-$, $-CO-$, $-SO_2-$,

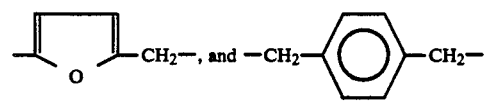

and R is the same or different and is selected from the group consisting of hydrogen and methyl radicals. The fiber of the present invention can be made a phenolic triazine derived from the cyanato group containing phenolic resin.

11 Claims, No Drawings

FIBERS MADE FROM CYANATO GROUP CONTAINING PHENOLIC RESINS AND PHENOLIC TRIAZINES RESINS

This application is a continuation of application Ser. No. 388,204 filed Aug. 1, 1989, now abandoned, which in turn is a divisional of application Ser. No. 135,946 filed Dec. 21, 1987, now U.S. Pat. No. 4,851,279.

Production of state of the art phenolic fiber involves basic phenolic curing chemistry. Typically, fiber is produced by melt-spinning a novolac resin and then curing the resulting precursor fibers in an acidic, aqueous solution of formaldehyde to effect crosslinking. During the processing it generates volatile by products, which ultimately diffuse into the skin on fiber surface and produce mechanically weak fiber. The ideal crosslinked phenolic fiber represented as:

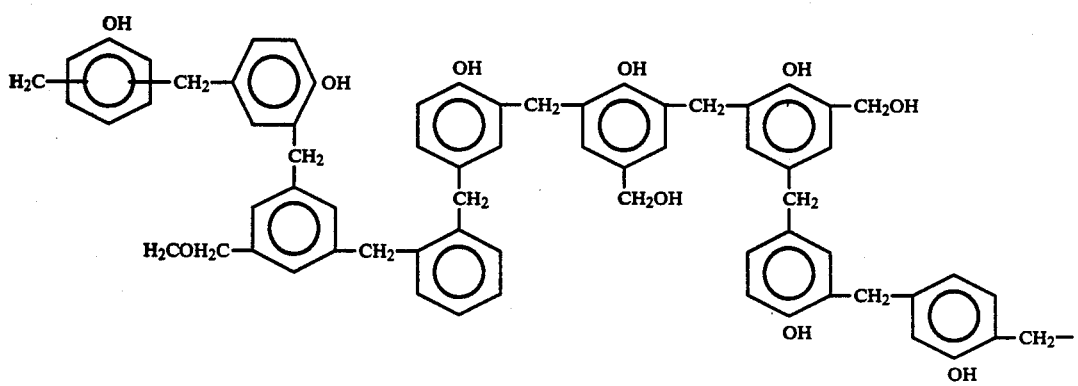

The present invention is in the field of fibers made from phenol based resins. More particularly, the present invention relates to fibers made of cyanato group containing phenolic resin, also known as phenolic cyanate resin, a method to prepare the fibers, and fibers made from triazine resins.

Cyanato group containing phenolic resins have been described in U.S. Pat. Nos. 3,448,079 and 4,022,755 as well as in Delano, et al, *Synthesis of Improved Phenolic Resins*, Acurex Corp/Aerotherm, Acurex Vinyl Report 79-25/As, Sep. 4, 1979 prepared for NASA Lewis Research Center, Contract No. Nas3-21368, and is available through the United States Department of Commerce National Technical Information Service.

A recent reference, Heat Resistance Polymers by Critchley, et al, pp. 406-408 Plenum Press, New York, 1986 has described phenolic triazine resins prepared from phenolic novolac or meta-cresol novolac which have essentially the same chemical structures as described in the above referenced patents.

The phenolic triazines which have been disclosed have been found to have high thermal stability. Copending U.S. Ser. No.104,700 filed Oct. 5, 1987, hereby incorporated by reference discloses cyanato group containing phenolic resins and phenolic triazines. The cyanato group containing phenolic resins are disclosed to be stable as measured by gel time. The phenolic triazine resins are disclosed to be thermally stable as measured by Thermal Gravimetric Analysis.

Crosslinked phenolic resin fibers are disclosed in the art. Hayes, S. L., "Novoloid Fibers", Kirk-Othmer, *Encyclopedia of Chemical Technology*, volume 16, pages 125-138 (John Wiley and Sons, Inc., 1981) discloses novoloid fibers as crosslinked phenolic-aldehyde fibers typically prepared by acid-catalyzed cross-linking of a melt-spun novolac resin with formaldehyde.

Phenol formaldehyde or novoloid fibers were invented by Dr. James Economy and coworkers at Carborundam Company in the late 1960s and early 1970s (U.S. Pat. No. 3,650,102) at present, Nippor Kynol,Inc, in Japan dna American Kynol (New York) manufacture and sell novoloid fibers under the trademark Kynol.

Kynol fibers are the only commercially available novoloid fibers, and are used in a wide variety of flame and chemical-resistant textiles and papers, in composites, gaskets, and friction materials, and as precusors for carbon and activated-carbon fibers, textiles and composites Novoloid fibers are highly flame resistant, but are not high temperature fibers. The temperature stability of novolac fiber is limited because of oxidative decomposition of mehtylene bridge leading to punking (afterglow) upon expositure to a flame.

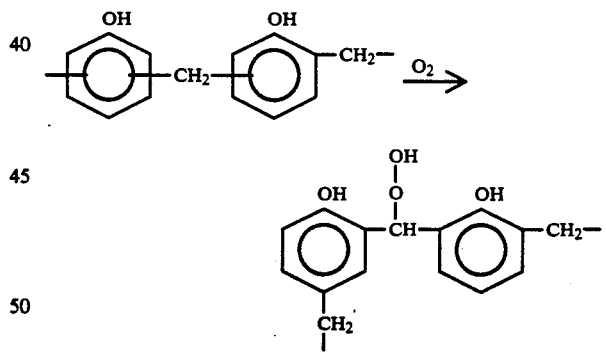

Decomposition of the peroxide formed at the methylene linkage is an exothermic reaction and leading to significant loss of weight and strength as temperatures approach 200° C.

U.S. Pat. No. 4,076,692 discloses a process for manufacturing novaloid fiber. This patent generally discloses forming a cured novolac fiber which comprises blending uncured novolac resin with a novolac crosslinking agent at a temperature below the curing temperature of the resulting blend. The process further comprises melting a portion of the resulting blend at a temperature of from 125° to 500° C. and fiberizing the melted portion before the melted portion cures to an extent which prevents such fiberizing. The resulting fibers are cured by contacting them with acidic gas at from 20° to 300°

C. and from about 1 to about 10 atmospheres of pressure.

During the processing of conventional phenolic fibers volatile byproducts are generated which can diffuse into the skin on the fiber surface and produce mechanically weak fiber. Presently such novaloid fibers are commercialized in a wide variety of flame and chemical resistant textiles and papers. They are used in composites gaskets and friction materials. They are also used as precursors for carbon and activated carbon fibers, textiles and composites. While novaloid fibers are highly flame resistant they are not high temperature fibers. The temperature stability of novalac fiber is limited because of oxidative decomposition of the methyl bridge between the phenol groups. This results in the significant loss of weight and strength as temperatures approach 200° C.

SUMMARY OF THE INVENTION

The present invention is a fiber comprising a cyanato group containing phenolic resin. The cyanato group containing resin (phenolic cyanate resin) is derived from a phenolic resin of the comprising repeating unit of the formula I:

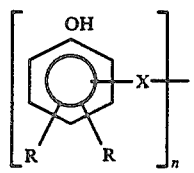
I wherein n is O or an integer of one or more, and X is a radical selected from the group consisting of: —CH$_2$—, —CO—, —SO$_2$—,

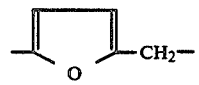

R is the same or different and is selected from the group consisting of hydrogen and methyl radicals.

The cyanato group containing phenolic resin is derived from the phenolic resin (formula I) and has repeating units of the formula II

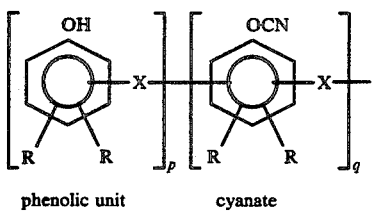
II phenolic unit     cyanate wherein
p is O or an integer of one or more,
q is O or an integer of one or more, and
X and R are defined as in formula I. There is from 10 to 100 mole percent, prferrably 50 to 100 mole percent, more preferably 80 to 100 mole percent and most preferably 85 to 100 percent of the cyanate units. The phenolic units and cyanato units can be distributed in any order, including random or block distribution along the polymer chain.

A preferred phenolic cyanate useful to make fibers has the formula III

III wherein Z is selected from —OCN and —OH.

Under the influence of heat and/or a suitable catalyst the phenolic cyanate resin such as that of formula II and preferably formula III reacts to form a phenolic cyanate-phenolic triazine precursor which is useful to form fibers. Such a precursor derived from formula III has the formula IV

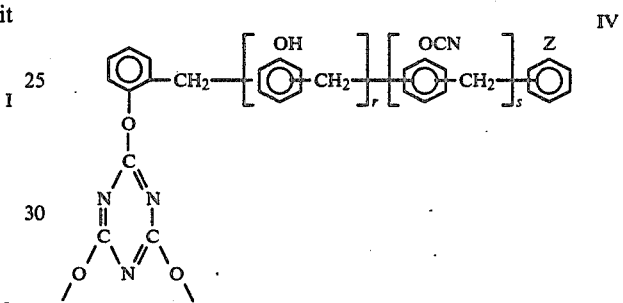
IV wherein Z is defined as above and r and s are O or an integer of one or more. Up to 80 mole percent of the cyanato groups react to form triazine groups in the precursor.

Fibers can be formed by meltspinning from the phenolic cyanate-phenolic triazine precursor and reacted to form phenolic-triazine fiber.

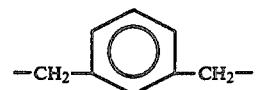

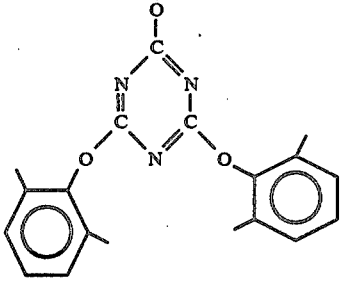

The advancement over the art is that the resin of the present invention is stable and has a long shelf life. This is indicated by the gel time of greater than 1 minute, and preferably greater than 2 minutes at 155° C. The most preferred range is from 3 to 10 minutes at 155° C. Ranges of gel times greater than 10 minutes can be used. The phenolic cyanato resin can cure to form phenolic triazine resin which can be characterized as having a thermal stability indicated by a thermal decomposition temperature of at least 400° C. and preferably of at least 450° C. as measured by Thermal Gravimetric Analysis (TGA).

The cyanato group containing phenolic resin of the present invention preferably has a number average molecular weight of from about 280 to 1500, preferably 320 to about 1500, more preferably about 500 to 1000 and most preferably about 600 to 1000.

The present invention includes a fiber comprising completely as well as incompletely cured phenolic triazine resin derived from the cyanato group containing phenolic resin described above. Typically, the phenolic triazine is formed by heating the cyanato group containing phenolic resin.

The present invention includes a method of making fiber from the cyanato group containing phenolic resin of the formula II, or phenolic cyanate-phenolic triazine precursor such as the preferred precursor of formula IV. The improvement of the method of the present invention is that the cyanato group containing phenolic resin is formed by first reacting a phenolic novolac resin and a base, preferably trialkyl amine in a cyclic ether solvent to form a trialkylammonium salt of novolac. This step is then followed by reacting the trialkylammonium salt with a cyanogen halide in the cyclic ether to form the cyanato group containing phenolic resin. It is particularly preferred to conduct the reaction at a temperature below about −5° C. and preferably from −5° C. to −45° C., more preferably −5° C. to −30° C. and most preferably −15° C. to −30° C.

The fibers of the present invention can be formed by suitable methods such as solution spinning and melt spinning using conventional equipment available for spinning phenolic fibers known in the art. Preferably, the fibers are melt-spun by heating the phenolic cyanate to above its melting point and spinning the fibers. The phenolic cyanate fiber can be incompletely cured and melt-spun. The melt-spun phenolic cyanate or incompletely cured phenolic cyanate resin fiber can then be crosslinked to form a completely cured or more completedly cured phenolic triazine. This is typically done at a temperature range of from 100° C. to 320° C. and preferably 120° C. to 280° C. and most preferably at about 240° C. to 260° C. The fibers are thermally stable upon complete curing.

The phenolic-triazine fibers can be used as chopped fiber in place of fiberglass or asbestos. The fiber can be made into cord, cloth or other textile articles.

The invention also relates to a composition comprising a fiber formed from the cyanato group containing phenolic resin of this invention or formed from the phenolic triazine resin formed from the cyanato group containing resin of this invention and a polymeric material selected from thermosetting resin and thermoplastic polymers.

DESCRIPTION OF THE PREFERRED EMBODIMENTS

The present invention is a fiber comprising a cyanato group containing phenolic resin; a fiber comprising a phenolic triazine resin derived therefrom; and a method to make the fiber. The present invention includes fibers made from incompletely cured cyanato group containing phenolic resins, also referred to as precursors, or phenolic cyanate-phenolic triazine resin.

The cyanato group containing phenolic resins, phenolic triazines, and incompletely cured cyanato group containing phenolic resins from which the fibers of the present invention can be made, include those described in U.S. Ser. No. 104,700 as well as U.S. Ser. No. 041,018 both hereby incorporated by reference. The phenolic resins useful in the present invention can be partially cyanated. Preferably, substantially all of the phenol groups are cyanated.

The cyanato group containing phenolic useful in the fiber of resin of the present invention has improved gel time and long shelf life. It has low volatiles, and excellent char yield and thermal properties.

The present invention is a fiber comprising a cyanato group containing phenolic resin. The cyanato group containing resin (phenolic cyanate resin) is derived from a phenolic resin comprising a repeating unit of the formula I:

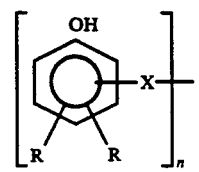

wherein n is O or an integer of one or more, and X is a radical selected from the group consisting of: —CH₂—, —CO—, —SO₂—,

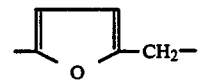

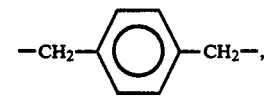

R is the same or different and is selected from the group consisting of hydrogen and methyl radicals.

The cyanato group containing phenolic resin is derived from the phenolic resin (formula I) and has repeating units of the formula II

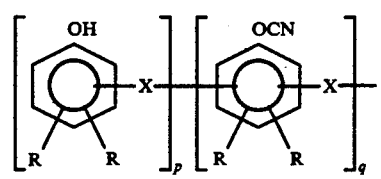

wherein
p is O or an integer of one or more,
q is O or an integer of one or more, and
X and R are defined as in formula I. There is from 10 to 100 mole percent, preferably 50 100 mole percent, more preferably 80 to 100 mole percent and most preferably 85 to 100 mole percent of the cyanate units. The phenolic units and cyanato units can be distributed in any order, including random or block distribution along the polymer chain Formula II with end groups which are typically used is shown as formula IIA

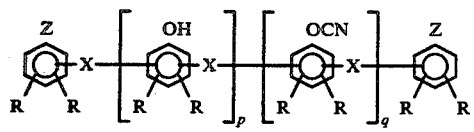

wherein Z is selected from —OCN and OH.

A preferred phenolic cyanate useful to make fibers has the formula III

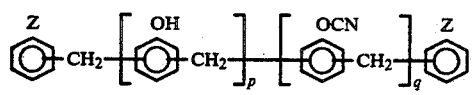

wherein Z is selected from —OCN and —OH.

Under the influence of heat and/or a suitable catalyst the phenolic cyanate, resin such as that formula II and preferably formula III reacts to form a phenolic cyanate-triazine precursor which is useful to form fibers. Such a precursor derived from formula III has the formula IV

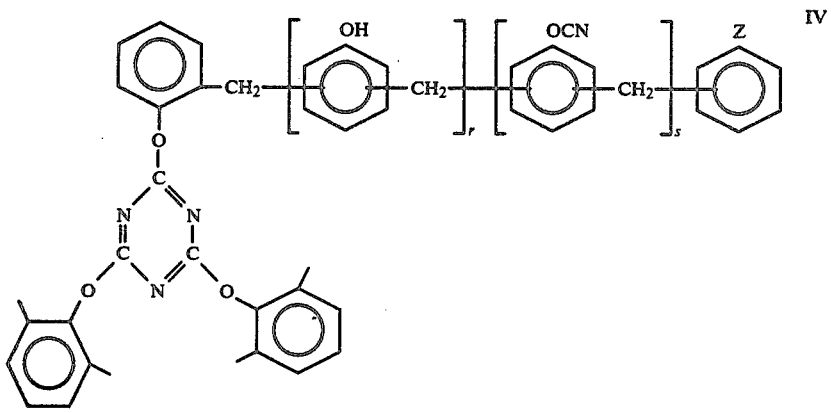

wherein Z is defined as above and r and s are 0 or an integer of one or more. Up to 80 mole percent of the cyanto groups react to form triazine groups in the precursor.

Fibers can be formed by meltspinning from the phenolic cyanate-phenolic triazine precursor and reacted to form phenolic-triazine fiber.

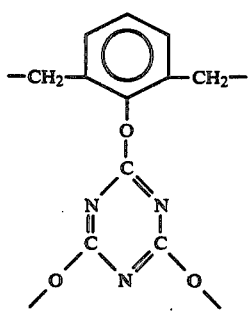

The resin has a gel time as measured by the Hot Plate Stroke cure Method (see Examples) of greater than 1 minute, preferably 2 minutes, more preferably greater than 3 minutes, and most preferably from 3 to 10 minutes at 155° C. Resin with gel time ranges greater than 10 minutes can be used. Resin with gel times of greater than 20 minutes can be used but result in slower curing fiber.

An alternate way of measuring the stability of the cyanto group containing phenolic resin by the resin being capable of forming a phenolic triazine resin having the thermal stability of at least 400° C. and preferably of at least 450° C. as measured by Thermal Gravimetric Analysis (TGA) (see Examples). The thermal stability of the compositions is measured by TGA by heating the sample at 10° C./min and determining the polymer decomposition temperature. The polymer decomposition temperature is the temperature at which the maximum rate of weight loss occurs. The phenolic triazine resin of the present invention has a char value at 900° C. of at least 50% by weight, preferably from 50 to 70% by weight, and more preferably 60 to 70% by weight.

It is believed that the improved properties of the phenolic cyanate resin for use in the fiber of the present invention are attributed to the resin having a residual amount of a dialkyl cyanamide, typically diethyl cyanamide of less than 2% by weight, preferably less than 1% by weight and most preferably substantially none. The diethyl cyanamide is undesirable because it generates smoke upon curing.

Preferably the cyanato group containing phenolic resin has a residual amount of phenyl cyanate of less than 2% by weight and preferably less than 1% by weight and most preferably less than 0.5% by weight. This is desirable since it has been found that the phenol cyanate is a volatile material than contributes to thermal instability and the formation of smoke during curing the resin.

The cyanato group containing phenolic resin for use in the fiber of the present invention results in satisfactory cured triazine materials regardless of molecular weight. The preferred molecular weight range is a number average molecular weight of 280 to 1500, preferably 320 to about 1500, more preferably about 500 to 1000 and most preferably from about 700 to 1000. The molecular weight distribution and number average molecular weight of the cyanato group containing phenolic resin can be determined by gel permeation chromatography(GPC) using tetrahydrofuran as a solvent.

The cyanato group containing phenolic resins forms a phenolic triazine network upon heating and/or in the presence of a curing agent. Typical curing conditions are from 150° to 250° C. under atmospheric or elevated pressures which can be up to 500 psi or higher for 0.1 to 1 hour depending on sample size. The high density of cross linkage of the cured products results in excellent characteristics including thermal properties and a glass transition temperature of 300° C. or higher.

The cyanato group containing phenolic resins useful in fibers of the present invention react by "cyclotrimerization" of the cyanato groups of the copolymer to varying degrees. As used herein a "completely cured" phenolic cyanate resin forms a phenol triazine polymer in which up to 80 mole percent of the cyanator group have reacted to form triazine groups leaving less than about 20 mole percent of the original cyanato groups remain unreacted, i.e., uncyclotrimerized, as determined by the method of Infrared Spectrophotometry (IR). A precursor also referred to as "partially cured" or "incompletely cured" triazine is one in which from 40 up to about 80 mole percent of the original cyanato groups are unreacted.

The cyanato group containing phenolic resin of the present invention is derived from a phenolic novolac. Useful phenolic novolac resins are known in the art. A typical and useful one is disclosed in U.S. Pat. No. 4,022,755 at column 2 beginning at line 27. Particularly useful phenols include phenol, cresol and xylenol.

The present invention includes a method to make the fiber comprising the cyanato group containing phenolic resin recited above. This involves the steps of reacting novolac resin and a trialkyl amine in a cyclic ether solvent to form the trialkylammonium salt of novolac. This is followed by reacting the trialkylammonium salt with a cyanogen halide in the cyclic ether to form the cyanato group containing phenolic resin. The reaction is conducted at a temperature range of below −5° C., preferably from −5° C. to −45° C., and more preferably from −5° C. to −30° C. and most preferably from −15° C. to −30° C.

The reaction product is in solution in the cyclic ether. This reaction product is a cyanato group containing phenolic resin. It is separated from the solution by a suitable separation technique. The preferred technique is precipitation into a non solvent medium. Useful nonsolvents are a alcohols with isopropanol being preferred. The separation is preferably conducted at atmospheric pressure. While it can be conducted at room temperature, the temperature is typically from −0° C. to −45° C., preferably −55° C. to −25° C. Precipitation is preferably conducted with agitation.

The improved properties of the resin used to make the fiber of the present invention are attributed to reacting the novolac resin and a trialkyl amine in a cyclic ether solvent to form the trialkylammonium salt of novolac resin this is followed by reacting the trialkylammonium salt with a cyanogen halide in the cyclic ether to form the cyanato group containing phenolic resin. The reaction is conducted at below about −5° C., preferably to −5° C. to −45° C., more preferably from −5° C. to −30° C. and most preferably from −15° C. to −30° C.

The cyclic ether solvent has been found to be an important reaction medium to form the cyanato group containing phenolic resin of the presen invention. The cyclic ether solvent is preferably selected from the group consisting of: tetrahydrofuran; 1,4 dioxan; and furan. The trialkyl amine can be selected from triethyl amine, tripropylamine and triethylcyclohexyl amine. Additionally, the reaction medium can contain other bases to control the pH to help control the rate of the reaction.

The relative amounts of solvent i.e. tetrahydrofuran, trialkylamine, and phenolic resin used should be controlled to control gel time of the cyanato group containing phenolic resin. Concentrations can be measured as a function of the weight percent of the trialkyammonium salt which could theoretically be calculated based on the weight of the trialkylamine, phenolic resin and solvent. Preferably, the amount of trialkylammonium salt is from 5 to 35, more preferably 10 to 25, and most preferably from 10 to 20 percent by weight. The preferred concentration can vary depending on the specific solvents and reactants used.

A preferred phenolic cyanate resin useful to make the fiber of the present invention begins with a phenolic novolac backbone. This is reacted with cyanogen halide such as cyanogen bromide (CNBr) in presence of an organic base, such as triethylamine (Et₃N) in a solvent such as tetrahydrofuran (THF) to form phenolic cyanate

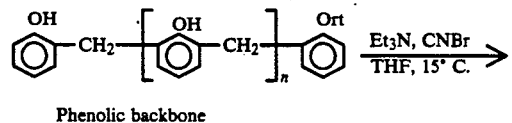

Phenolic backbone

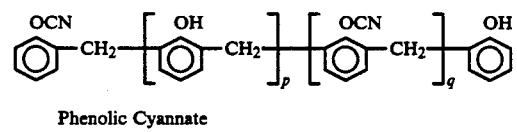

Phenolic Cyannate

Under the influence of heat and/or a suitable phenolic-cyanate forms phenolic cyanate-phenolic triazine precursor.

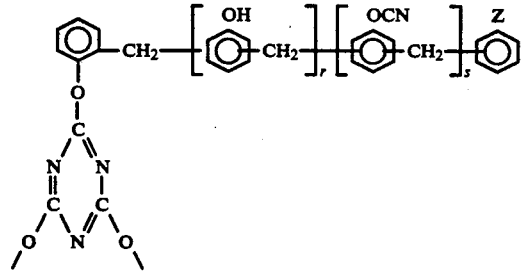

Fibers can be formed by meltspinning from the phenolic cyanate-phenolic triazine precursor to form phenolic-triazine fiber.

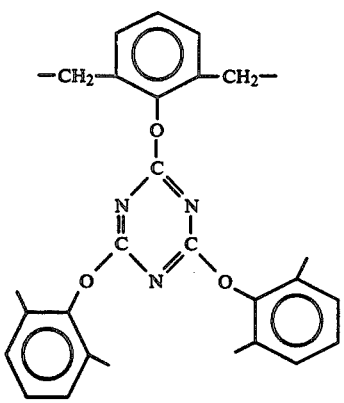

Both triazine and cyanate ester formation deactivate the benzene nucleus and thus inhibits peroxide formation at the methylene linkage, through both steric and inductive effects. Thermal and oxidative stability is enhanced and the possibility of afterglow or punking is deminished. In addition to thermal and oxidative stability, the mechanical properties is substantially improved through the contribution of the ether and triazine bridge.

The fibers of the present invention made of cyanato group containing phenolic resin or phenolic triazine resin can be made in suitable ways to make fibers. The preferred methods include melt spinning and solution spinning. Useful ways to make fibers are described in U.S. Pat. No. 4,076,692, hereby incorporated by reference. Briefly the resin is melted prior to fiberizing. However, because of the stability of the cyanato group containing phenolic resin of the present invention the concern about fiberizing in a relatively fast time after melting expressed in U.S. Pat. No. 4,076,692 is not as critical. The phenolic cyanate resin of the present invention can be spun or can first be incompletely cured and then spun. Typically, the resin is heated to a temperature of from 100° C. to 120° C., preferably. Unlike the spinning of conventional novalac resins where the upper temperature limitation is critical because of the decomposition of that resin at a temperature of 350° C. , the present invention is directed to a triazine resin which forms and is stable at very high temperatures up to 470° C. and typically 420° C. to 450° C.

The melted resin can be fiberized by any suitable means including rapidly extruding resin through a heated dye, centrifically spinning fibers from the melt resin, and blowing fibers from the melt resin with a compressed gas such as compressed air. A particularly suitable laboratory method is by using a Instron ® Capillary Rheometer.

After the fibers are formed they can be used in their incompletely cured state or they can be completely cured by heating. Although the curing can be catalyzed, it is preferred to cure the fibers by simply heating to the temperature ranges recited above for forming the triazine resin from the cyanato containing phenol resin.

The fibers of the present invention particularly in the phenolic triazine form are stable at high temperatures in ranges up to 420° C. to 470° C. they are useful in applications such as reinforcing fillers for friction resistant components such as for use in brakes and gaskets. They are also useful as an asbestos replacement. The fibers are sueful in chopped form suitable in lengths, typically from 1/16 inch to 1 inch in length. Alternatively the fiber can be used to make yarn, cord or rope. The fibers can be formed into fabric by suitable textile processing.

The chopped fiber can be used in place of chopped glass or asbestos fibers. Compositions can comprise the chopped fibers and thermosetting resins or thermoplastic polymers. The fiber can be used as a friction resistant filler in place of asbestos in compositions for use as brakes, clutches, and the like.

The recent trend in automotive brake system is to use non-asbestos based formulation for friction material. Phenolic-triazine fiber is derived from phenolic novolac. Phenolic novolac resin is commonly used as a binder in friction compositions. Fiber made of phenolic triazine has similar chemical structure and as novolac resin will enhance the processing operation in frictional composites.

Woven and knit fabric can be made. The thermal stability and flame resistance of the phenolic triazine makes cloth from this fiber useful in a variety of applications where flame resistance is important. This fiber can be used in flame resistant clothing, curtains and the like.

Several examples are set forth below to illustrate the nature of the invention and method of carrying it out. However, the invention should not be considered as being limited to the details thereof. All parts are by weight unless otherwise indicated.

SAMPLE TESTING

Measurements were made to determine the gel time of the cyanato containing phenolic resins produced by Examples 1 through 3 of the present invention as well as the comparative examples. The samples were tested for gel time using the following procedure:

Apparatus

Stop watch
0°–250° C. thermometer
Electric hot plate, adjusted to 155±1° C. and enclosed in a wind shield
4" Spatula

Method

1. For powdered resins: Weigh out a 1.0 gram sample on a watch glass.
2. Quickly dump the complete sample on the center surface of the hot plate and at the same time start the stop watch.
3. Using a 4" spatula spread the resin over a 2 inch square area in the center of the hot plate and stroke the entire area with the spatula at a rate approximating 80 strokes per minute. Without stopping the watch, note the time it took for the resin to melt.
4. Continue stroking, keeping the blade of the spatula close to the surface of the resin, until the resin has passed through a stringy stage and suddenly seems hard and glazed and offers little or no resistance to stroking with the spatula. This end point is best determined only after considerable practice to get the "feel" of the resin as it "lets go" at its gel point.
5. Record number of seconds to melt and number of seconds for gel time (cure time). Subsequent checks on the same sample should agree within ±5 seconds.

Smoke generation was a visual observation during testing of gel time. A satisfactory material will substantially have no smoke or vapor generation during gel measurement at 155° C. The material used in the Examples was satisfactory.

EXAMPLE

Preparation of the Phenolic Cyanate Resin

A mixture of 204 g of novolac (630 number average molecular weight) and 202 g triethylamine was dissolved in 0.8 liters of tetrahydrofuran (THF) at ambient temperature to form a triethyl ammonium salt of novolac. A 222 g sample of cyanogen-bromide was dissolved in 1.2 liters of tetrahydrofuran under nitrogen atmosphere. The solution containing the triethylammonium salt of novolac was added to cyanogen bromide solution over a period of one to 1½ hours. During the addition, the temperature of the reaction mixture was maintained at −15° to −20° C. After the addition was completed, the reaction mixture was stirred for additional an 18 hours and the temperature of reaction mixture rose to about −2° C. to −5° C. The mixture was warmed to room temperature. The product was isolated by filtration to remove triethylammonium bromide salt. The filtrate was purified by precipitation in a cold isopropanol (−30° C.) and a white precipitate was isolated. The white precipitate which is the polymer, was redissolved in THF and precipitated again. The product was subsequently dried overnight to produce an off white phenolic cyanate resin as indicated by Infrared Spectrum. Infrared Spectra also indicated the presence of 5% free phenolic groups. The gel time was 3 minutes at 155° C.

The phenolic cyanate was melted on aluminum foil at 100° C. for 15 minutes under 30 inches of Hg to obtain a phenolic cyanate-phenolic triazine precursor (incompletely reacted phenolic cyanate). The precursor was melted to 125° C. and fibers were drawn with a glass rod. The fibers were cured at 250° C. for about one half hour.

The fibers were tested to determine the oxidative stability using the Thermal Gravimetric Analysis (TGA). The samples were heated at 10° C./min from 0° C. in air. Sample size was from 30 to 40 mgs. Comparative 1 was a phenolic formaldehyde resin fiber XF02BT produced by Nippon Kynol. Comparative 2 was Kevlar ® polyaramid pulp (short fibers) made by the DuPont Compnay. The initial weight loss for the samples of Comparatives 1 and 2 up to 200° C. may be due to moisture loss. The results of the TGA are summarized in Table 1 which follows:

TABLE 1

| Material % Wt loss @ | Ex 1 PT | Comp 1 Phenolic Formaldehyde | Comp 2 Kevlar |
|---|---|---|---|
| 100° C. | 0 | 4 | 4 |
| 200 | 0 | 4 | 4 |
| 300 | 0 | 5 | 4 |
| 400 | 0 | 14 | 5 |
| 500 | 19 | 79 | 10 |
| 600 | 29 | 99 | 100 |

EXAMPLE 2

Preparation of the Phenolic Cyanate

A mixture of 204 g of novalac (613 number average molecular weight) and 212 g triethylamine was dissolved in one liter of tetrahydrofuran at ambient temperature for form a triehtyl ammonium salt of novolac. A 240 g sample of cyanogen bromide was dissolved in one liter of tetrahydrofuran under nitrogen atmosphere. The solution containing the triethylammonium salt of novolac was added to cyanogen bromide solution with a average addition rate 7–8 ml/min. During the addition, the temperature of the reaction mixture was maintained at −20° to −30° C. After the reaction was completed, the reaction was allowed to continue for additional one hour to bring the temperature of reaction mixture to +10° C. The product was isolated by filtration to remove triethylammonium salt. The filtrate was purified by precipitation in a cold isopropanol/dry ice mixture (−15° C. to −20° C.) (twice), and subsequently dried in a vacuum overnight to produce an off which phenolic cyanate The elemental analysis indicated: wt % C=73.5 (73.5), wt % H=4.0 (3.82), and wt % N=10.6 (10.7). The numbers in parentheses are theoretical values. The elemental analysis is based on the empirical formula of the phenolic cyanate unit, $C_8H_6NO$. The IR Spectrum indicated absorption at −C=N (22.50($m^{-1}$) and absence of any carbamate. The gas chromatographic (GC) analysis showed absence of diethyl cyanamide. The gel time was minutes at 155° C.

Intermediate (Precursor)

A 50 gm sample was spread onto aluminum foil and placed in a preheated vacuum oven at 125° C. for 30 minutes under 30 inches of Hg pressure. The material melted under this condition. The material was cooled to room temperature and ground to a fine powder. From IR Spectrum about 10% of the cyanate groups were converted to triazine groups.

The precusor was formed into fiber using a Instron ® Capillary Rheometer. The die used was 0.225 inches long, and 0.015 inches in diameter. The resin was fed into the die at 55° C. at a pressure of 20 psi. A vacuum was applied to remove trapped air, prior to compaction. The temperature was increased to 145° C. and held for 8 minutes prior to extrusion. The flow observed was irregular as indicated by a shear rate range of 130–1300 sec-1. A more stable extrusion rate is expected by varying conditions such as increasing the temperature, and varying time. The fiber was drawn from the die at 145° C. and taken up onto a cooling roll at about room temperature. The fiber was white. The cooled fiber was stored on a spool.

Samples of the fiber were then cured in oven in air for ½ hour at 80° C., 1 hour at 100° C., 1½ hour at 150° C., 2 hours at 200° C. and 1 hour at 250° C. After curing the fiber light yellow, the fiber appeared to be satisfactory to handle and in appearance.

EXAMPLE 3

A mixture of 50 grams of novolac (613 number average molecular weight) and 51.0 grams of triethylamine was dissolved in 160 grams of tetrahydrofuran at ambient temperature to form the triethylammonium salt. A 53 gram sample of cyanogen bromide was dissolved in 135 grams of tetrahydrofuran under nitrogen atmosphere. The solution containing the triethylammonium salt of novolac was added to cyanogen bromide solution with an average addition rate 7–8 ml/min. During the addition, the temperature of the reaction mixture was maintained at −20° to −30° C. After the reaction was completed, the reaction mixture was stirred for an additional one hour and the temperature of the reaction mixture rose to +10° C. The product was isolated by filtration to remove triethyl ammonium salt. The filtrate was purified by precipitation in a cold isopropanol/dry ice mixture (−15° C. to −20° C.) (twice) and subsequestly dried in a vacuum over night at 40° C. to produce an off which phenolic cyanate. The gel time at 155° C. was 3 minutes. This material can be used to draw fiber in any suitable manner such used in Example 2.

While exemplary embodiments of the invention have been described, the true scope of the invention is to be determined from the following claims:

What is claimed:

1. A composition comprising polymeric material selected from thermosetting resins and thermoplastic polymers and fibers which comprises a cyanato group containing phenolic resin comprising repeating units of the formula:

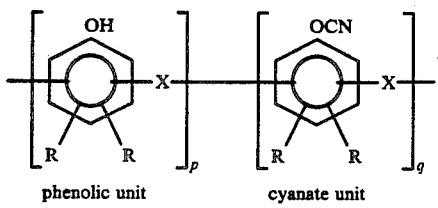

wherein p is 0 or an integer of 1 or more, q is 0 or an integer of 1 or more, —X— is a radical selected from the group consisting of:

—CH$_2$—, —CO—, —SO$_2$—,

CH— and

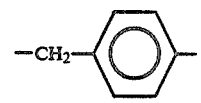

CH$_2$—; and

R is the same or different and is selected from hydrogen and methyl groups there being from 10 to 100 mole percent cyanato units.

2. The composition as recited in claim 1 wherein the resin has substantially no smoke generation during gel time measurement.

3. The composition of claim 1 wherein the resin has a gel time of greater than 1 minute at 155° C.

4. The composition of claim 3 wherein the resin has a gel time of from 3 to 10 minutes at 155° C.

5. The composition as recited in claim 1 wherein the cyanato group containing resin has a number average molecular weight of from 280 to 1500.

6. The composition as recited in claim 1 wherein there are from 80 to 100 mole percent cyanato units.

7. The composition is recited in claim 1 wherein said fiber is in the form of a chopped fiber.

8. The composition as recited in claim 1 wherein said fiber is in the form of yarn.

9. The composition as recited in claim 1 wherein the cyanato group containing resin has the formula:

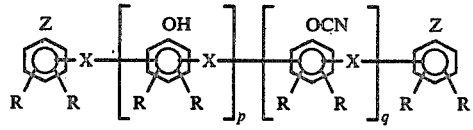

wherein Z is selected from —OH and —OCN.

10. The composition of claim 7 wherein said polymeric material is a phenolic novolac resin.

11. The composition of claim 1 wherein the phenolic triazine resin has a thermal decomposition temperature of at least 400° C. as measured by Thermal Gravimetric Analysis.

* * * * *